United States Patent
Hsu et al.

(10) Patent No.: US 8,976,146 B2
(45) Date of Patent: Mar. 10, 2015

(54) METHOD OF REDUCING COMPUTATION OF WATER TOLERANCE BY PROJECTING TOUCH DATA

(75) Inventors: Jih-Ming Hsu, Hsinchu (TW); Chin-hua Kuo, Hsinchu (TW)

(73) Assignee: Silicon Integrated Systems Corp., Hsinchu (TW)

(*) Notice: Subject to any disclaimer, the term of this patent is extended or adjusted under 35 U.S.C. 154(b) by 325 days.

(21) Appl. No.: 13/454,060

(22) Filed: Apr. 23, 2012

(65) Prior Publication Data

US 2013/0278543 A1    Oct. 24, 2013

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/0418* (2013.01); *G06F 2203/04104* (2013.01); *G06F 2203/04106* (2013.01)
USPC .......................................... 345/174; 345/173

(58) Field of Classification Search
CPC ... G06F 3/041; G06F 3/044; G06F 2201/805; G06F 2201/81; G06F 2203/04104; G06F 2203/04106; G06F 2203/04107
USPC .................................................. 345/173–174
See application file for complete search history.

(56) References Cited

U.S. PATENT DOCUMENTS

| | | | |
|---|---|---|---|
| 2009/0095540 A1* | 4/2009 | Zachut et al. | 178/18.03 |
| 2009/0174676 A1* | 7/2009 | Westerman | 345/173 |
| 2011/0175835 A1* | 7/2011 | Wang | 345/173 |
| 2013/0093692 A1* | 4/2013 | Wang et al. | 345/173 |

* cited by examiner

*Primary Examiner* — Kathy Wang-Hurst
*Assistant Examiner* — David Tung (57) ABSTRACT

A method of reducing computation of water tolerance by projecting touch data is disclosed, targeting the handheld devices. The method targets first at obtaining a difference array, followed by extracting minimum values of rows and columns of the difference array to obtain a row projection list and a column projection list respectively. By repeated implementing of mutual capacitance detection, ghost water blocks can be wiped out from the multiple water blocks. Once integrating with a local spatial boundary detection algorithm, the sensed signals of intended input located within a rectangular water block yet beyond a real water block are consequently detected. The computational algorithm of the water tolerance of this invention is successfully built into the touch panel controller due to its substantially reduced computation.

8 Claims, 6 Drawing Sheets

METHOD OF REDUCING COMPUTATION OF WATER TOLERANCE BY PROJECTING TOUCH DATA

BACKGROUND OF THE INVENTION

1. Field of the Invention

The present invention relates to water tolerance methods, and more particularly, the present invention relates to a method of reducing computation of water tolerance by projecting touch data.

2. Description of the Prior Art

Figure 1A:
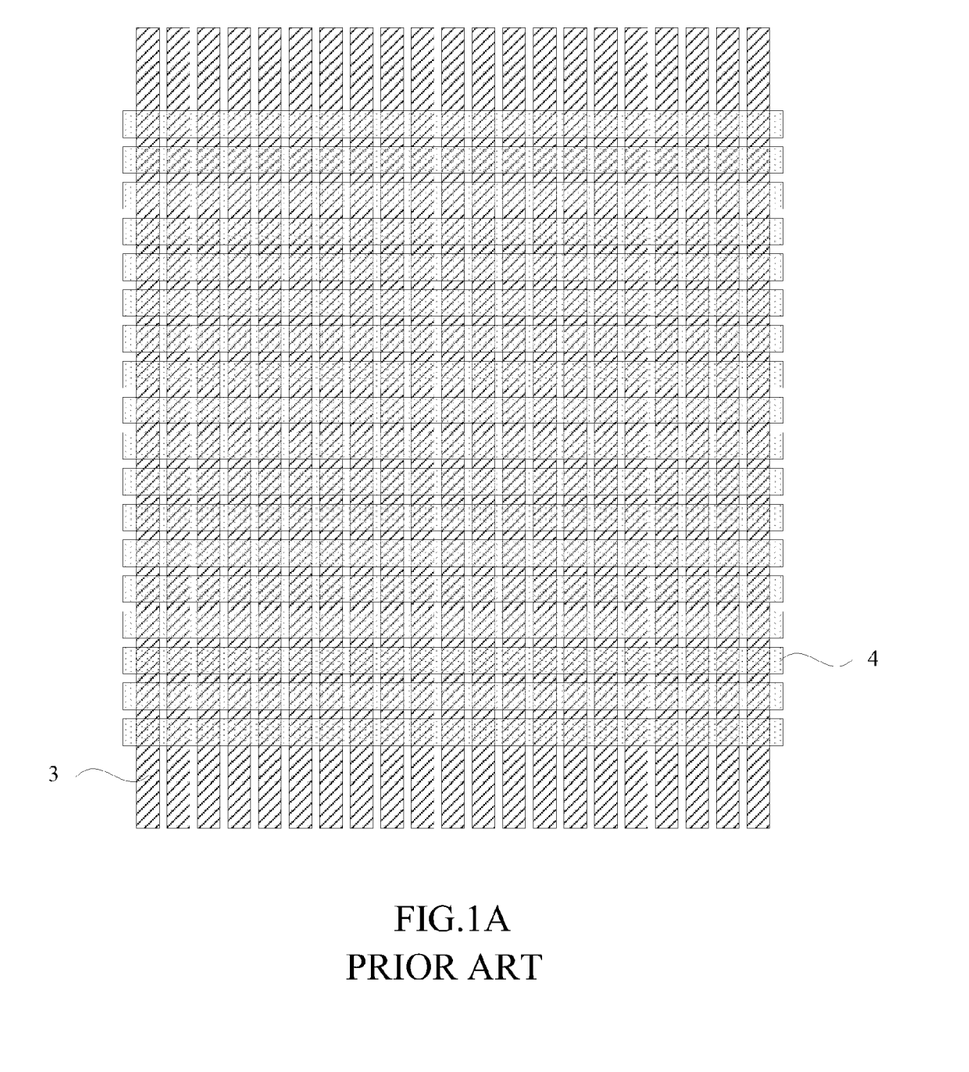
FIG. 1A is a schematic diagram of the raw data matrix of a touchscreen constructed by bar-type sense elements of prior techniques.
Figure 1B:
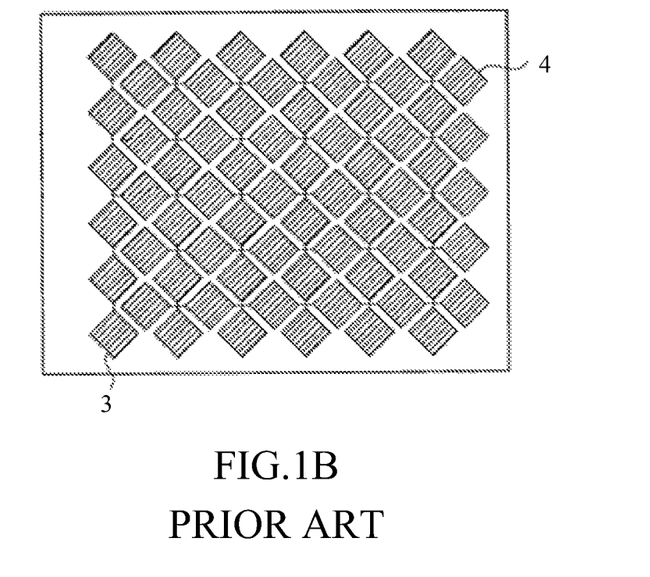
FIG. 1B is a schematic diagram of the raw data matrix of a touchscreen constructed by diamond-type sense elements of prior techniques.

Capacitive touch panels originated from the improvement of inferiority in enduring scrapes of resistive touch panels. The detection of touches by capacitive touch panels simply recognizes the alteration of static electric field. Among all the touch technologies, single touch capacitive, also known as surface capacitive, matures with popularity substantially and is also manufactured with ease. Compared with the single-touch type, projected capacitive type adopts single layer or multiple layers of patterned ITO, to form a detection matrix. In self-capacitance detection technology, the accompanied touch panel contains row electrodes 3 and column electrodes 4, shown in FIGS. 1A and 1B. Once a finger taps on the touch panel, the self-capacitance of the electrodes in the proximity will be lifted, which is the consequence of the accumulation of all the self-capacitances in parallel. As the self-capacitance for each electrode is detected, the control chip is ready to acquire the variances of capacitances of all electrodes. And the related prior algorithms are used to find out possible positions of the touches. Unfortunately, the way the variances of capacitance in the electrodes detected by self-capacitance approach would bring about ghost points, which makes the self-capacitance approach fail to identify precisely the real positions of two touches or more.

On the other hand, in mutual-capacitance detection technology, its panel contains a raw data matrix that is a grid formed by row electrodes 3 and column electrodes 4 carried with capacitances. Unlike the target to be detected in self-capacitive touchscreen is the capacitance variance of entire electrode, the mutual-capacitive touchscreen detects merely the capacitance variance at intersects of crossed column and row electrodes. Different from the detection of X+Y pieces of electrodes in the self-capacitance type where X, Y are numbers of electrodes of the raw data matrix, the mutual-capacitance approach detects capacitance of X·Y independent points of intersects of the crossed electrodes, and it does mean that the mutual capacitance approach is capable of detection of multiple touches.

Although the mutual capacitance approach is well suited to the detection of multiple touches, the implementing of the detection is practically harder than that of the self-capacitance type, and the mutual capacitance of each intersect has smaller capacitance variance value comparatively. Supposing that mutual capacitance is the only data to be applied, the advanced touch features like those realized by the touch pen are unlikely being supported. Furthermore, the prior technologies in computation of water tolerance are sizable, and still not available to be built into the touch panel control chip.

Accordingly, it is known from the capabilities and inefficiencies of the prior art that the self-capacitance approach is limited in the detection of multiple touches while the mutual capacitance is smaller detected data than the self-capacitance. It was also reasonable to infer that the detection is once combined by the mutual capacitance approach with local spatial boundary detection algorithm, the computation of water tolerance would be substantially reduced, which then will be available for the computational algorithm of water tolerance to be built into the touch panel control chip.

SUMMARY OF THE INVENTION

The objective of the present invention is to provide a method of reducing computation of water tolerance by projecting touch data, targeting the handheld devices. The method targets first at obtaining a difference array, followed by extracting minimum values of rows and columns of the difference array to obtain a row projection list and a column projection list respectively. By repeated implementing of mutual capacitance detection, ghost water blocks can be wiped out from the multiple water blocks. On the other hand, the zone to be rejected for a real water block is a rectangle; therefore, any sensed signals of intended input fallen within the rectangular water blocks yet beyond the real water blocks are rejected together. By means of integration with a local spatial boundary detection algorithm, the sensed signals of real input located within the rectangular water blocks yet beyond the real water blocks are consequently detected. Due to the sizable reduction of the computation of the present method, the computational algorithm of the water tolerance can be built into the touch panel control chip.

To achieve the aforementioned objective, the present invention provides a method of reducing computation of water tolerance by projecting touch data, suited to the handheld devices, and the sizable reduction of computational algorithm of water tolerance is available to be built into the control chip of the touchscreen. The method comprises the following steps: obtaining capacitance raw data of a sensing array having row sensing lines and column sensing lines; comparing the capacitance raw data with reference raw data to obtain a difference array; obtaining a row projection list by extracting minimum values of rows of the difference array; and obtaining a column project list by extracting minimum values of columns of the difference array.

In an embodiment of this invention, the current raw data of the sensing array are obtained by measuring self-capacitances of the respective row sensing lines and the respective column sensing lines.

In an embodiment of this invention, the current raw data of the sensing array are obtained by measuring mutual capacitances between the row sensing lines and the column sensing lines.

In an embodiment of this invention, the reference raw data comprises a capacitance matrix computed by a statistic model under a condition that no touch or water block event occurs on the sensing array.

In an embodiment of this invention, the reference raw data is computed by using a static calibration procedure.

In an embodiment of this invention, the reference raw data is computed by using a dynamic calibration procedure.

In an embodiment of this invention, the method further comprises a step of determining at least one rectangular water block by the row projection list and the column projection list.

In an embodiment of this invention, the step of determining at least one rectangular water block by the row projection list and the column projection list is to compare the row projection list with a first water threshold and compare the column projection list with a second water threshold respectively to form a row water mask and a column water mask to determine an extent of the water block.

In an embodiment of this invention, the corresponding row water mask or column water mask equals to 1 if a sensed signal of a sensing line in the water block lowers than the water threshold; otherwise, the corresponding row water mask or column water mask equals to 0 if a sensed signal of a sensing line in the water block exceeds the water threshold.

In an embodiment of this invention, if the number of the adjoined row sensing lines in the water block is greater than a row-threshold and the number of the adjoined column sensing lines in the water block is greater than a column-threshold, the sensed signals generated in the water block are filtered out or neglected.

In an embodiment of this invention, the number of the adjoined row sensing lines in the water block multiplied by the number of the adjoined column sensing lines in the water block is greater than an area-threshold, the sensed signals generated in the water block are filtered out or neglected.

In an embodiment of this invention, further comprising a step of filtering out ghost water blocks from the rectangular water blocks one after the other, which is accomplished by filtering out ghost water blocks from the plurality of water blocks by means of mutual capacitance detection.

In an embodiment of this invention, further comprising a step of preventing dynamic calibration on real water blocks, which prevents the real water blocks from being mistaken for sensed signals or palm blocks when the water is dry.

In an embodiment of this invention, further comprising: detecting the sensed signals fallen within the rectangular water blocks yet beyond real water blocks by means of combining a local spatial boundary detection algorithm.

The advantages of the realization of the present invention comprise: detection of multiple water blocks while rejection of the ghost water blocks. Moreover, any sensed signals of the desired input fallen within the rectangular water blocks yet beyond the real water blocks can also be detected by integrating with a local spatial boundary detection algorithm. The computational algorithm of the water tolerance of this method can be successfully built into the touch panel control chip.

This invention is detailed described with reference to the following preferred embodiments and the accompanying drawings for better comprehension.

DETAILED DESCRIPTION OF THE INVENTION

The following embodiments are described with reference to the following accompanying drawings which exemplify the realizations of this invention.

Figure 2:
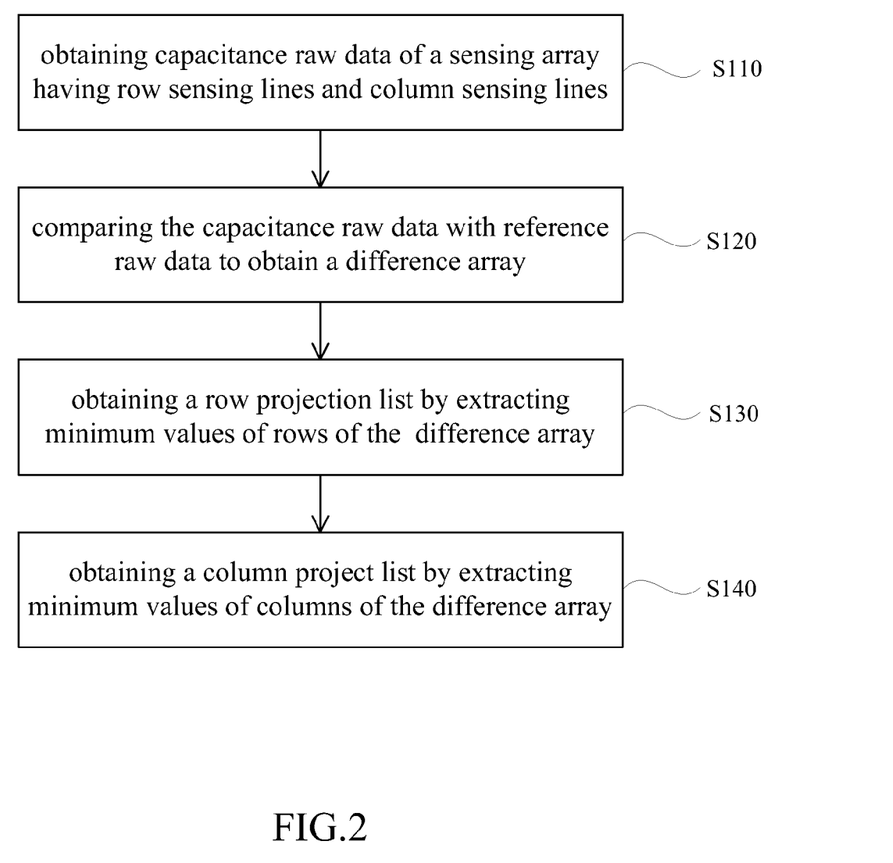
FIG. 2 is a flowchart of the method of reducing computation of water tolerance by projecting touch data of a preferred embodiment of the present invention.

Referring to FIG. 2, FIG. 2 is a flowchart of the method of reducing computation of water tolerance by projecting touch data of a preferred embodiment of the present invention. The present invention targets the handheld devices, and the sizable reduction of the computation of the water tolerance proves in the following embodiments to enable the computational algorithm of the method to build into the touch panel control chip (not shown in the figure). The method 10 of the present invention comprises the following steps:

STEP 1 (S110): obtaining capacitance raw data of a sensing array having row sensing lines and column sensing lines;

STEP 2 (S120): comparing the capacitance raw data with reference raw data to obtain a difference array;

STEP 3 (S130): obtaining a row projection list by extracting minimum values of rows of the difference array; and STEP 4 (S140): obtaining a column project list by extracting minimum values of columns of the difference array.

Figure 3:
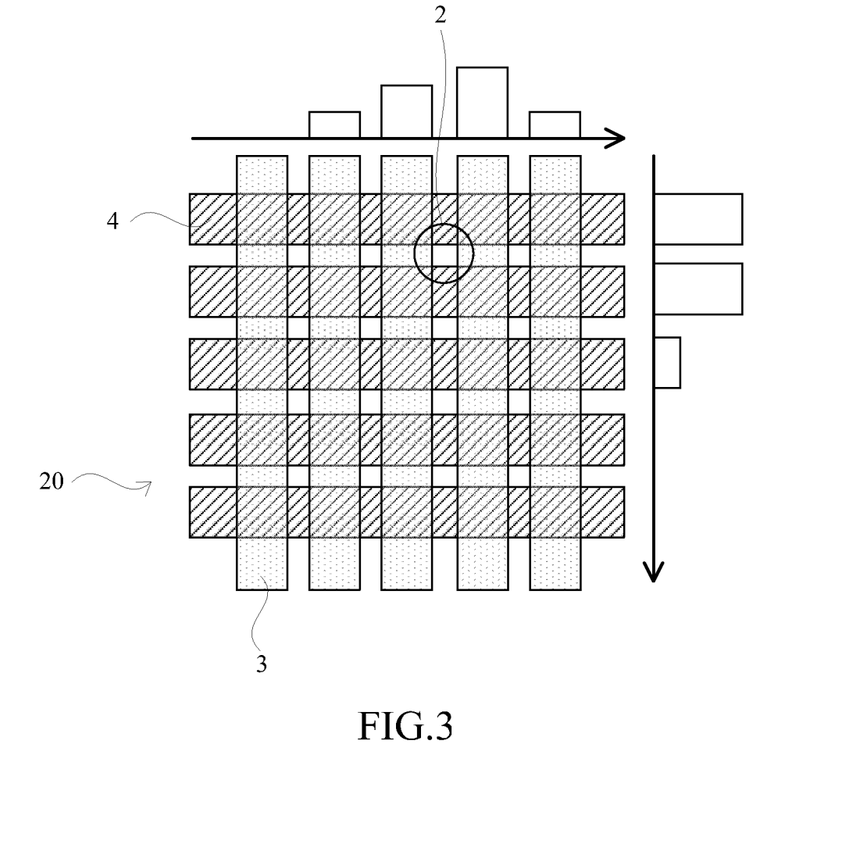
FIG. 3 is a schematic diagram of the raw data matrix detected by self-capacitance of a preferred embodiment of the present invention.

Referring to FIG. 3, FIG. 3 is a schematic diagram of the raw data matrix detected by self-capacitance of a preferred embodiment of the present invention. As in FIG. 3, the present embodiment is a method 10 of reducing computation of water tolerance by projecting touch data, and the raw data matrix 20 is made up of plural row sensing lines 3 and plural column sensing lines 4. The self-capacitance hereto refers to the capacitance coupling occurred by the interaction of a touching object and the sensing lines in the proximity. The self-capacitance approach detects capacitance variances of the sensing lines to determine the possible locations of the touches. Likewise, once a tap 2 by a finger occurs on a touchscreen, the self-capacitances of the row sensing lines 3 and the column sensing lines 4 in the proximity will be lifted, and the possible locations of the touches can then be tracked.

Figure 4:
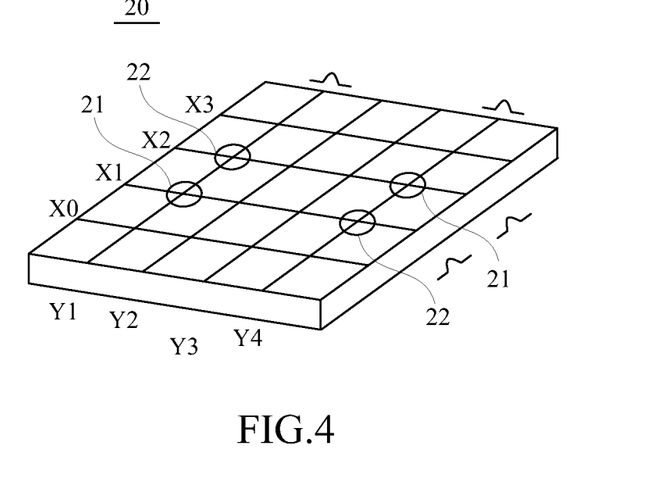
FIG. 4 shows the ghost touches and real touches detected by self-capacitance of a preferred embodiment of the present invention.

Referring to FIG. 4, FIG. 4 shows the ghost touches and real touches detected by self-capacitance approach of a preferred embodiment of the present invention. In the embodiment, the self-capacitance touchscreen technology is exemplified by the cross arrangement of row sensing lines Y1-Y4 and column sensing lines X0-X3. During the detection of the touches, a touch panel controller (not shown in the figure) will scan the row sensing lines Y1-Y4 and column sensing lines X0-X3 where the row sensing lines Y1 and Y4 and column sensing lines X1 and X2 related to the touches will give rise to pulses that are shown in the top and right of the FIG. 4, which are the outcome of the capacitance couplings occurred between a touching object and those sensing lines, and the intersections of two row sensing lines Y1, Y4 and two column sensing lines X1, X2 are the possible locations of the touches. By means of a specific prior computational algorithm, the possible locations of the touches can be recognized; however, the precise detection of the real locations of the touches still remains unsettled for the self-capacitance approach.

As in FIG. 4, two touches (not shown in the figure) by a touching object bring about a pulse at each of the row sensing lines Y1, Y4 and a pulse at each of the two column sensing lines X1, X2. The intersections of the two sets of pulses constitute four touches, among which two are ghost touches 21 and the other two are real touches 22. The two ghost touches 22 inevitably cause difficulty in detection by the touch panel system.

Figure 5:
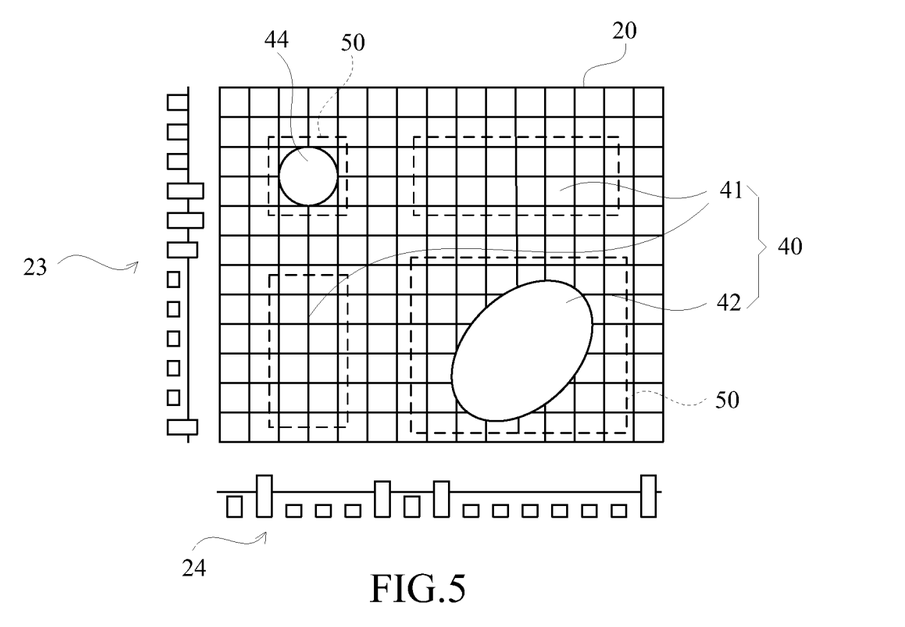
FIG. 5 is a schematic diagram of a row projection list and a column projection list formed and corresponding ghost water blocks and real water blocks of a preferred embodiment of the present invention.

Referring to FIG. 5, FIG. 5 is a schematic diagram of a row projection list and a column projection list formed and corresponding ghost water blocks and real water blocks of a preferred embodiment of the present invention. In the embodiment, a difference matrix is obtained by subtracting a calibrated raw data matrix from the raw data matrix 20 of sensed signals, and the calibrated raw data matrix is a capacitance matrix computed by a statistic model with static and dynamic calibration under the conditions of no touches and water blocks; the static calibration is capable of adjusting difference between touchscreens while the dynamic calibration is capable of tracking the variances of temperature and humidity.

In the embodiment, the row projection list 23 and the column projection list 24 are formed by the difference matrix (not shown in the figure), and the row water mask 231 (not shown in the figure) and the column water mask 241 (not shown in the figure) are the outcome of comparison between each projected member of row projection list 23 or each projected member of column projection list 24 with a water threshold 30 respectively; the corresponding row water mask 231 or column water mask 241 equals to 1 if a sensing line lowers than the water threshold; otherwise, the corresponding row water mask 231 or column water mask 241 equals to 0 if a sensing line exceeds the water threshold.

Referring again to FIG. 5, in an embodiment of this invention, the step of determining water blocks 40 by the row water mask 231 and the column water mask 241 can be achieved, provided that the number of the adjoined row sensing lines in the water block 50 is greater than a threshold-row and the number of the adjoined column sensing lines in the water block 50 is greater than a threshold-column, the sensed signals 42, 44 generated in the water block are filtered out or neglected. However, to those skilled in the art, the threshold-row and threshold-column can be different constant values, subject to the requirements of specific applications for different purposes or different nations in the world.

Referring again to FIG. 5, in an embodiment of this invention, to determine water blocks 40 by the row water mask 231 and the column water mask 241 can be achieved, provided that the number of the adjoined row sensing lines in the water block multiplied by the number of the adjoined column sensing lines in the water block is greater than a threshold-area, the sensed signals generated in the water block are filtered out or neglected. To those skilled in the art, the determination of water blocks 40 can also be achieved by way of the row projection list 23 and the column projection list 24.

Figure 6:
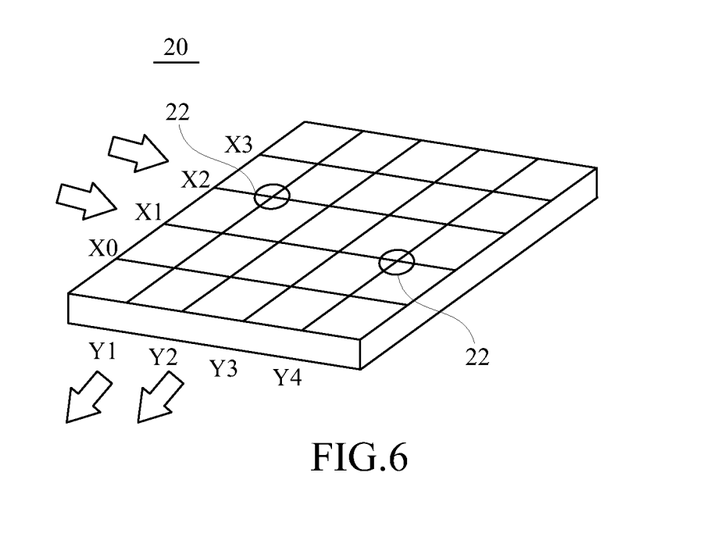
FIG. 6 is a schematic diagram of ghost touches filtered out from all the possible touches by means of mutual capacitance detection of a preferred embodiment of the present invention.

Referring to FIGS. 4, 5 and 6, FIG. 6 is a schematic diagram of ghost touches filtered out from all the possible touches by means of mutual capacitance detection of a preferred embodiment of the present invention. In an embodiment of this invention, it is the implementing of mutual capacitance detection that can filter out ghost touches 21 from all the possible touches where the ghost touches 21 are brought by the self-capacitance detection, shown in FIGS. 4 and 6. The way to reject the ghost touches 21 is through the projection of each of the possible touches individually, which is to acquire minimum values of a difference matrix for each of the possible touches, from which a column projection list and a row projection list for each touch are obtained. And a column water mask or a row water mask for each touch is obtained by comparing the column projection list or row projection list with its corresponding water threshold. Once the detection of each of the touches is accomplished, the ghost touches 21 can be wiped out, and the real touches 22 are identified. The other issue of the projection coverage of one another for the touches can also be eliminated considerably. By means of recursive principle, the area of water block 40 to be detected is reduced gradually until the length and width of the water block 40 equal to the corresponding water-height and water-width values, or the area of the water block 40 is identical to the corresponding water-area value, the ghost water blocks 41 can then be excluded.

Figure 7:
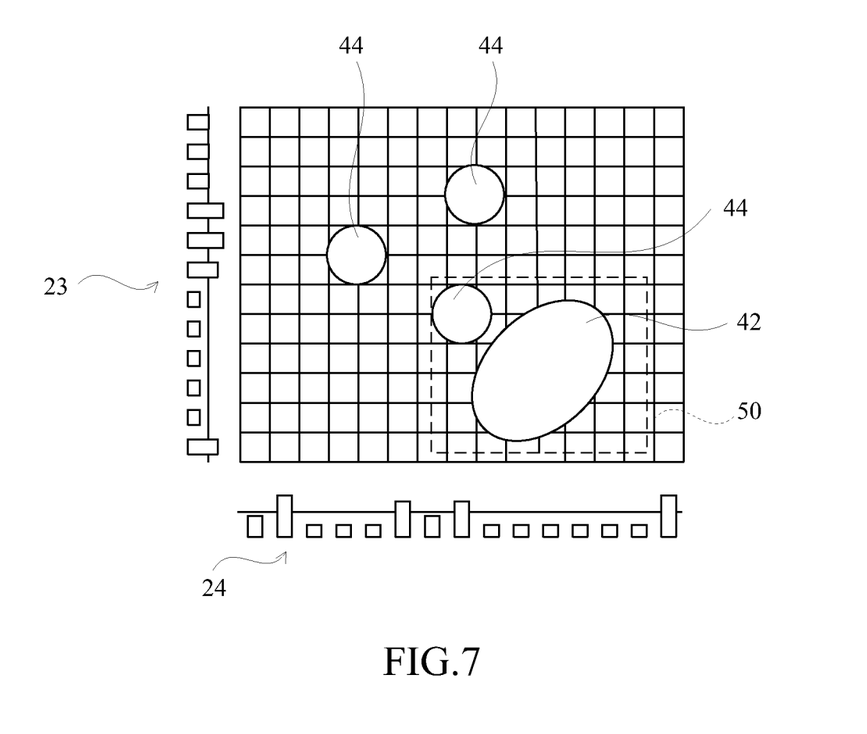
FIG. 7 is a schematic diagram of real water blocks and sensed signals of intended inputs outside the rectangular water block and within the rectangular water block yet beyond the real water block of a preferred embodiment of the present invention.

FIG. 7 is a schematic diagram of real water blocks and sensed signals of intended inputs outside the rectangular water block and within the rectangular water block yet beyond the real water block of a preferred embodiment of the present invention. In an embodiment of this invention, the step of detecting the sensed signals 44 of the intended inputs fallen within the rectangular water blocks 50 yet beyond real water blocks 42 is executed by means of combining local spatial boundary detection algorithm; therefore, the present invention further works as a preprocessing system of the water tolerance to avoid the rejection of the sensed signals of intended inputs. The real water blocks 42 are identified through the recursive principle to decrease the extent of each water block 50, and the ghost water block can be wiped out. The sensed signals 44 included in the rectangular water block 50 yet beyond the real water block 42 can be distinguished by means of combining a local spatial boundary detection algorithm. Accordingly, the issue of the sensed signals 44 of intended input that was wiped off together can be substantially improved. The sensed signals 44 outside of the rectangular water block 50 can be identified during the implementing the mutual capacitance detection.

It is essential to notice that the borders of the real water blocks 42 could be mistaken for the sensed signals 44 or palm blocks when the water is dry, so that the borders of the real water blocks 42 should be rejected. To make the border unambiguous, the real water blocks could be expanded to cover one more sensing line at their borders.

In general, although a few embodiments of the present invention have been disclosed, the above preferred embodiments are not used for limiting this invention, and it will be understood by those of ordinary skill in the art that various changes in form and details may be made therein without departing from the spirit and scope of the present invention.

What is claimed is:

1. A method of reducing computation of water tolerance by projecting touch data, the method comprising steps of:
    obtaining capacitance raw data of a sensing array having row sensing lines and column sensing lines;
    comparing the capacitance raw data with reference raw data to obtain a difference array;
    obtaining a row projection list by extracting minimum values of rows the difference array; and
    obtaining a column project list by extracting minimum values of columns of the difference array;
    determining at least one rectangular water block by the row projection list and the column projection list;
    preventing dynamic calibration on the at least one rectangular water block;
    wherein the step of determining at least one rectangular water block by the row projection list and the column projection list is to compare the row projection list with a first water threshold and compare the column projection list with a second water threshold respectively to form a row water mask and a column water mask to determine an extent of the at least one rectangular water block, and wherein if a number of adjoined row sensing lines in the at least one rectangular water block is greater than a row-threshold and a number of adjoined column sensing lines in the at least one rectangular water block is greater than a column-threshold, sensed signals generated in the at least one rectangular water block are filtered out or neglected.

2. The method of reducing computation of water tolerance by projecting touch data as claimed in claim 1, wherein a current raw data of the sensing array are obtained by measuring self-capacitances of the respective row sensing lines and the respective column sensing lines.

3. The method of reducing computation of water tolerance by projecting touch data as claimed in claim 1, wherein a current raw data of the sensing array are obtained by measuring mutual capacitances between the row sensing lines and the column sensing lines.

4. The method of reducing computation of water tolerance by projecting touch data as claimed in claim 1, wherein the reference raw data comprises a capacitance matrix computed by a statistic model under a condition that no touch or water block event occurs on the sensing array.

5. The method of reducing computation of water tolerance by projecting touch data as claimed in claim 4, wherein the reference raw data is computed by using a static calibration procedure.

6. The method of reducing computation of water tolerance by projecting touch data as claimed in claim 4, wherein the reference raw data is computed by using a dynamic calibration procedure.

7. The method of reducing computation of water tolerance by projecting touch data as claimed in claim 1, further comprising a step of filtering out ghost water blocks from rectangular water blocks one after the other, which is accomplished by filtering out the ghost water blocks from the rectangular water blocks by means of mutual capacitance detection.

8. The method of reducing computation of water tolerance by projecting touch data as claimed in claim 1, further comprising: detecting sensed signals fallen within rectangular water blocks yet beyond real water blocks by means of combining a local spatial boundary detection algorithm.

* * * * *